United States Patent [19]

Pospischil et al.

[11] Patent Number: 5,267,239

[45] Date of Patent: Nov. 30, 1993

[54] CROSS-CONNECT METHOD FOR STM-1 SIGNALS OF THE SYNCHRONOUS DIGITAL MULTIPLEX HIERARCHY

[75] Inventors: Reginhard Pospischil, Graefelfing Lochham; Horst Mueller, Hohenschaeftlarn, both of Fed. Rep. of Germany

[73] Assignee: Siemens Aaktiengesellschaft, Munich

[21] Appl. No.: 759,729

[22] Filed: Sep. 12, 1991

Related U.S. Application Data

[63] Continuation of Ser. No. 560,548, Jul. 30, 1990, abandoned.

[30] Foreign Application Priority Data

Aug. 31, 1989 [DE] Fed. Rep. of Germany ....... 3928905
Sep. 8, 1989 [DE] Fed. Rep. of Germany ....... 3930007

[51] Int. Cl.⁵ .......................... H04J 3/12; H04J 3/22
[52] U.S. Cl. ..................................... 370/112; 370/60; 370/84; 370/94.1; 370/99; 370/110.1
[58] Field of Search ..................... 370/58.1, 58.2, 58.3, 370/60, 60.1, 79, 82, 83, 84, 94.1, 99, 102, 105.1, 110.1, 111, 112; 340/825.79

[56] References Cited

U.S. PATENT DOCUMENTS

| | | | |
|---|---|---|---|
| 4,484,327 | 11/1984 | Hanson | 370/84 |
| 4,797,875 | 1/1989 | Pospischil | 370/92 |
| 4,807,221 | 2/1989 | Stummer | 370/112 |
| 4,811,341 | 3/1989 | Fujimoto et al. | 370/112 |
| 4,862,480 | 8/1989 | Gupta | 370/84 |
| 4,933,934 | 1/1990 | Aikoh et al. | 370/112 |
| 4,975,908 | 12/1990 | Pospischil | 370/94.1 |

FOREIGN PATENT DOCUMENTS 3511352 10/1986 Fed. Rep. of Germany .
3923172.0 7/1989 Fed. Rep. of Germany .

OTHER PUBLICATIONS

"General Aspects of Digital Transmission Systems; Terminal Equipments", CCITT, Blue Book, vol. III-—Fascicle III.4 Recommendations G.700–G.795, Nov. 1988, pp. 121–128, 142–145.

CCITT Recommendation G.709, FIG. 1.1/G.709, Jul. 1988, pp. 155–116.

Temporary Document 117, ETSI STC TM3, Aveiro, Oct. 27, 1989.

"Broadband Subscriber Loop System Using Multi-Gigabit Intelligent Optical Shuttle Nodes" by Fujimoto et al, Global Telecommunications Conference 1987, Nov. 1987, pp. 1449–1454.

*Primary Examiner*—Douglas W. Olms
*Assistant Examiner*—Alpus H. Hsu
*Attorney, Agent, or Firm*—Hill, Van Santen, Steadman & Simpson

[57] ABSTRACT

Cross-connect method for STM-1 signals of a synchronous digital multiplex hierarchy. Data blocks having differing multiplex structure of the synchronous digital multiplex hierarchy are processed in common in a cross-connect equipment. Controlled via a bus by a microprocessor, Au-4 administration units of STM-1 signals are resolved into virtual container groups of approximately the same length such as TUG-31 and TU-31. After the removal of auxiliary signals that are no longer required, an individual switching matrix network clock matching pointer and an individual switching matrix network overhead are respectively attached to these virtual container groups for the formation of uniform switching matrix network input signals (D39, D52). After a rearrangement in a switching matrix network, switching matrix network clock matching pointers and overheads are again taken from the switching matrix network output signals and are evaluated. Subsequently, the input signals (D39, D52) are subjected to a corresponding multiplexing method for the formation of new STM-1 signals. This method is employable in cross-connect and drop insert multiplexing equipment.

19 Claims, 8 Drawing Sheets

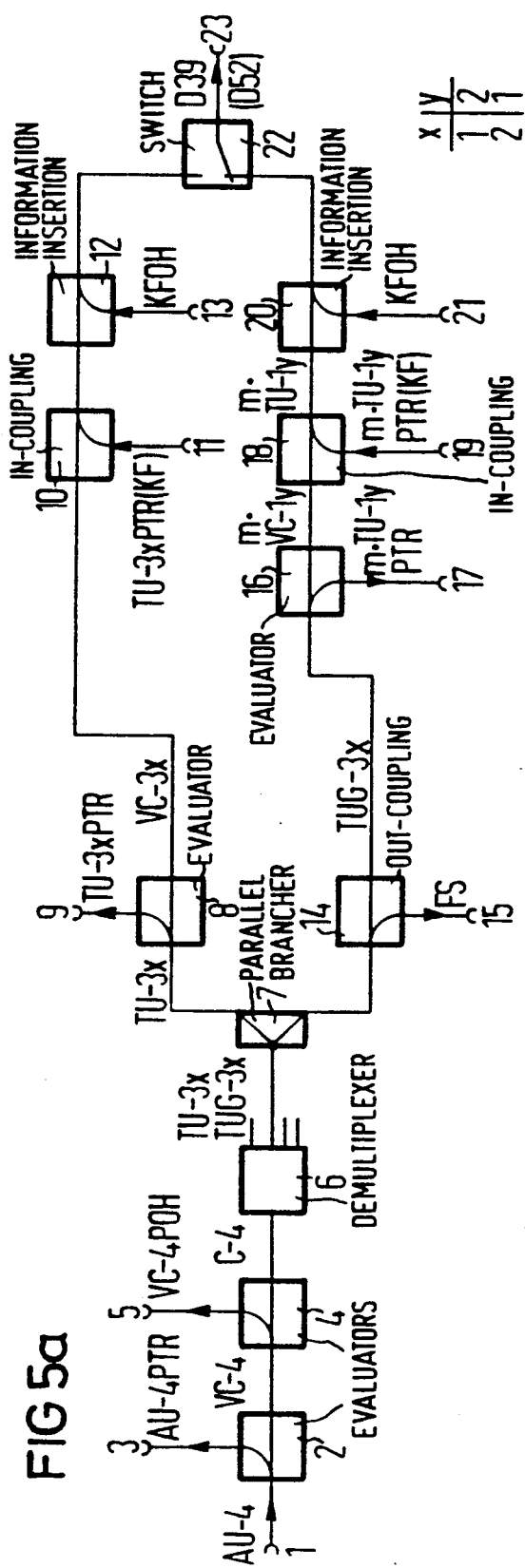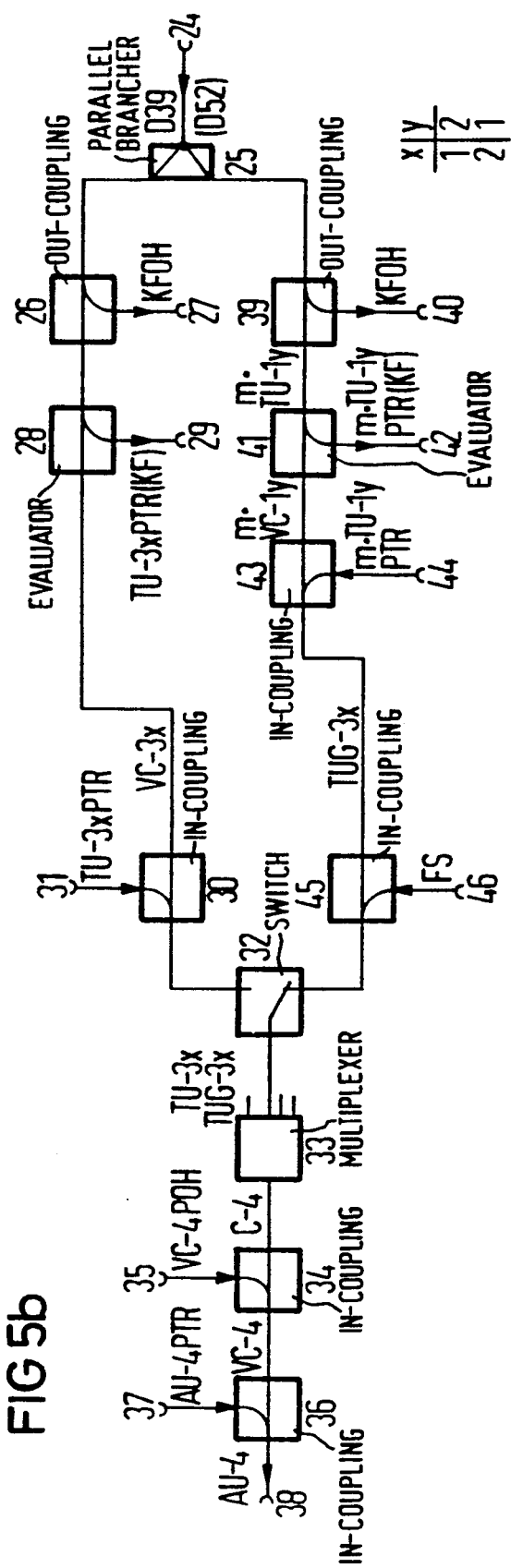

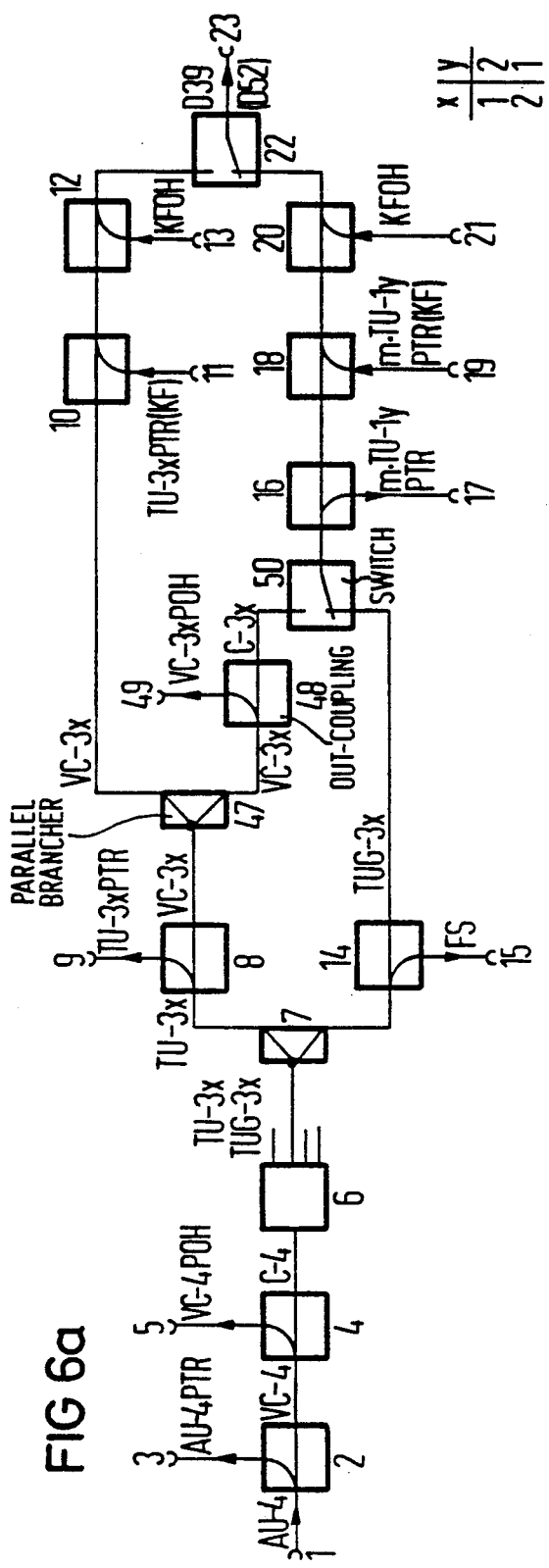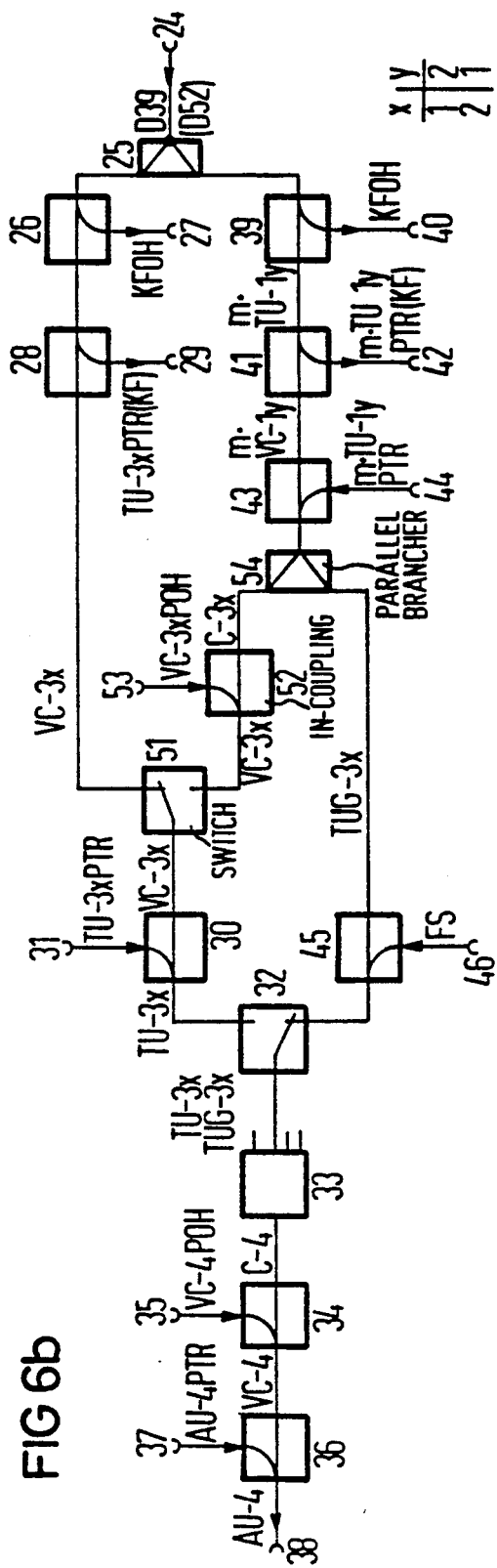

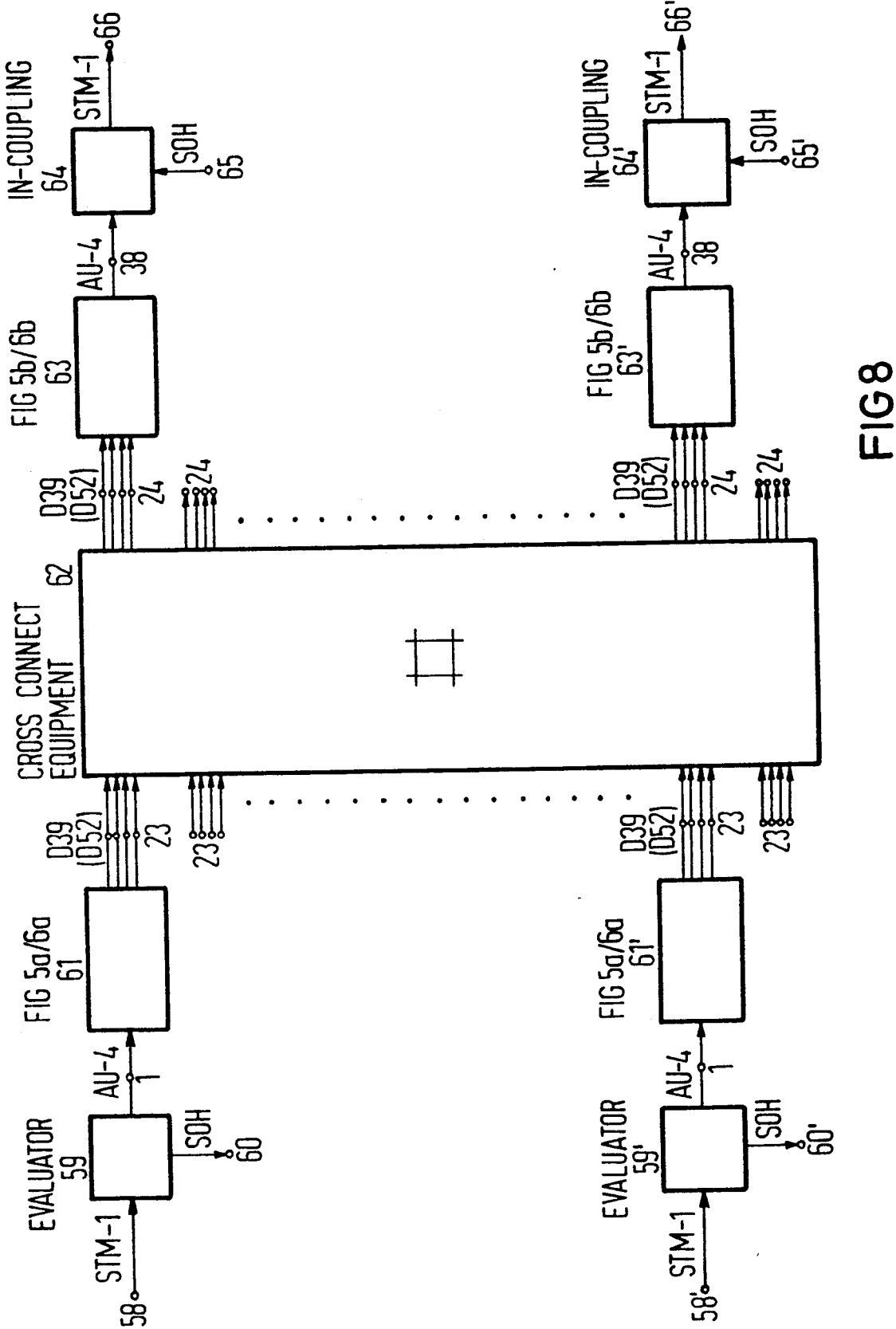

CROSS-CONNECT METHOD FOR STM-1 SIGNALS OF THE SYNCHRONOUS DIGITAL MULTIPLEX HIERARCHY

This is a continuation of application Ser. No. 560,548, filed Jul. 30, 1990, now abandoned.

BACKGROUND OF THE INVENTION

The present invention is directed to a cross-connect method for STM-1 signals of a synchronous digital multiplex hierarchy upon multiple employment of demultiplexing methods wherein each STM-1 signal is first divided into three or, respectively, four upper units and these are subsequently respectively divided into tributary units including individual outputs for the separation of 1544, 6312, 44,736, 2048, 8448, and/or 34,368 kbit/s signals, optionally via different paths, upon multiple employment of multiplexing methods that reverse these demultiplexing methods, and upon employment of methods for the operation of a switching matrix network.

The above-referenced multiplexing and demultiplexing methods are known, for example, from CCITT Recommendation G.709, FIG. 1.1/G.709 and from a multiplex structure that was disclosed at the European Transmission Standards Institute ETSI at the TM3 Meeting (Transmission and Multiplexing) in Brussels between Apr. 24 and 28 1989.

German Published Application DE 35 11 352 A1 discloses a method and a switching equipment for distributing plesiochronic broadband digital signals, whereby these signals, controlled by a central clock, are converted into intermediate digital signals containing auxiliary signals upon filling and, after passing through a switching matrix network, are in turn re-converted into plesiochronic broadband digital signals.

In one method (P 9 23 172.0, a post-published German patent application, corresponding to U.S. Ser. No. 539,890, filed Jun. 18, 1990) data blocks of different multiplexing levels are converted into cross-connect data blocks that are ordered in a fixed super-frame for a transmission bit rate of 38,912 kbit/s (D39 signal).

SUMMARY OF THE INVENTION

An object of the present invention is to provide a method with which data blocks having differing multiplex structure can be converted into cross-connect data blocks.

This object is achieved by a method according to the present invention in which: STM-1 signals are resolved in the demultiplexing methods into virtual container groups of approximately the same length; an individual switching matrix network clock matching pointer and an individual switching matrix network overhead are respectively attached to these virtual container groups for the formation of uniform switching matrix network input signals upon waiver of auxiliary signals that are no longer required; controlled by the signal content of the switching matrix network input signals and/or by a network management, switching matrix network input signals deriving respectively from an upper unit are supplied to the switching matrix network; the virtual containers of the switching matrix network input signals are rearranged before acceptance into the switching matrix network output signals; the switching matrix network overheads are taken from the switching matrix network output signals and are evaluated; the switching matrix network output signals are respectively subjected to a multiplexing method for the formation of STM-1 output signals; and controlled by the signal content of the switching matrix network output signals and/or by the network management, respectively one path in the multiplexing method is thereby selected.

In further developments of the present invention the following can be incorporated with the above-described method. A switching matrix network frame alignment signal, switching matrix network route addresses, and switching matrix network quality monitoring information can be provided as switching matrix network overhead. A switching matrix network overhead can be attached only to the switching matrix network input signals supplied to the switching matrix network. Virtual container groups 16×VC-12, 4×VC-22, 1×VC-31, 20×VC-11 and/or 5×VC-21 can be provided. Switching matrix network clock matching pointers TU-12 PTR (KF), TU-22 PTR (KF), TU-31 PTR (KF), TU-11 PTR (KF) and/or TU-21 PTR (KF) can be provided, and switching matrix network input signals and output signals (D39) having a bit rate of 38,912 kbit/s can be provided. Virtual container groups 28×VC-11, 7×VC-21, 1×VC-32 and/or 21×VC-12 can be provided; switching matrix network clock matching pointers TU-11 PTR (KF), TU-21 PTR (KF), TU-32 PTR (KF) and/or TU-12 PTR (KF) can be provided; and switching matrix network input signals and output signals (D52) having a bit rate of 51,968 kbit/s can be provided. For the input side of the switching matrix network, wherein a VC-4 virtual container is taken from a STM-1 signal from its AU-4 administration unit upon out-coupling and evaluation of an AU-4 PTR administration unit pointer, wherein the C-4 container is taken from the VC-4 virtual container upon out-coupling and evaluation of its VC-4 POH path overhead and wherein the C-4 container is divided into four alternative pairs each respectively composed of one TU-3x tributary unit or of one TUG-3x tributary unit group, each alternative pair can be supplied to two paths connected at the input side and alternately through-connected to the switching matrix network at the output side; in the first path, the VC-3x virtual container can be taken from a TU-3x tributary unit upon out-coupling and evaluation of the TUG-3x PTR tributary unit pointer and a TU-3x PTR (KF) switching matrix network clock matching pointer and a switching matrix network overhead (KFOH) can be attached to the VC-3x virtual container; and in the second path, a fixed filling (FS) and a plurality m of TUG-1y PTR tributary unit pointers can be taken from a TUG-3x tributary unit group upon evaluation and a plurality m of TU-1y PTR (KF) switching matrix network clock matching pointers and a switching matrix network overhead (KFOH) are attached to the remaining plurality m of VC-1y virtual containers for the formation of a switching matrix network input signal (D39, D52) (x=1 and y=2 or x=2 and y=1). The VC-3x virtual container can be supplied to a third path that branches off from the first path; the C-3x container can be taken from the VC-3x virtual container on the third path upon out-coupling of its VC-3x POH path overhead; and instead of a TUG-3x tributary unit group without fixed FS stuffing, this C-3x container can be supplied into the remaining part of the second path upon disconnection of the corresponding, first part of the second path. For four switching matrix network output signals, wherein a respective VC-4 POH path overhead is attached to the C-4 containers for the formation of a VC-4 virtual container, and wherein a respective AU-4 PTR pointer is attached to the VC-4 virtual containers for the formation of AU-4 administration units of STM-1 signals, groups of four switching matrix network output signals can be formed; each switching matrix network output signal (D39, D52) can be supplied to two paths that are connected at the input side and are alternately through-connectable at the output side; the switching matrix network overhead (KFOH) and the TU-3x PTR (KF) switching matrix network clock matching pointer can be taken in the first path for acquiring a TU-3x tributary unit and a TU-3x PTR pointer can be attached; the switching matrix network overhead (KFOH) and a plurality m of TU-1y PTR (KF) switching matrix network clock matching pointers can be taken in the second path for acquiring a TUG-3x tributary unit group and a plurality m of TU-1y PTR pointers and a fixed filling (FS) can be attached; and either the TU-3x tributary unit or the TUG-3x tributary unit group of each of the four alternative pairs can be respectively inserted into a C-4 container (x=1 and y=2 or x=2 and y=1). The TUG-3x tributary unit group without fixed filling (FS) can be supplied to a third path branching off from the second path after the in-coupling of a plurality m of TU-1y PTR pointers; a VC-3x POH path over-head can be attached to the C-3x container in the third path for the formation of a VC-3x virtual container; and this VC-3x virtual container can be supplied into the remaining part of the first path for the acceptance of a TU-3x PTR pointer upon disconnection of the corresponding, first part of the first path. Identical method steps can be implemented in the first and second path with respectively one arrangement in time-division multiplex and switching-over steps can be triggered by the signal content and/or by the network management. The method steps can be controlled by a micro-processor or the execution thereof can be in an integrated circuit.

A virtual container group is composed of one or more virtual containers, sub-system units or sub-system unit groups.

A converter for transition from the structure of a sub-system unit group TUG-31 or TUG-32 to the structure of a sub-system unit TU-31 or TU-32 can be realized with this method. This method is likewise suited for constructing what is referred to as a drop insert multiplexer for the synchronous digital multiplex hierarchy.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 5a shows a first demultiplexer;
FIG. 5b shows a first multiplexer;
FIG. 6a shows a second demultiplexer;
FIG. 6b shows a second multiplexer;
FIG. 8 is a block diagram depicting the connection of the circuits shown in FIGS. 5a/6a and 5b/6b to the cross-connect equipment.

DESCRIPTION OF THE PREFERRED EMBODIMENT

Figure 1:
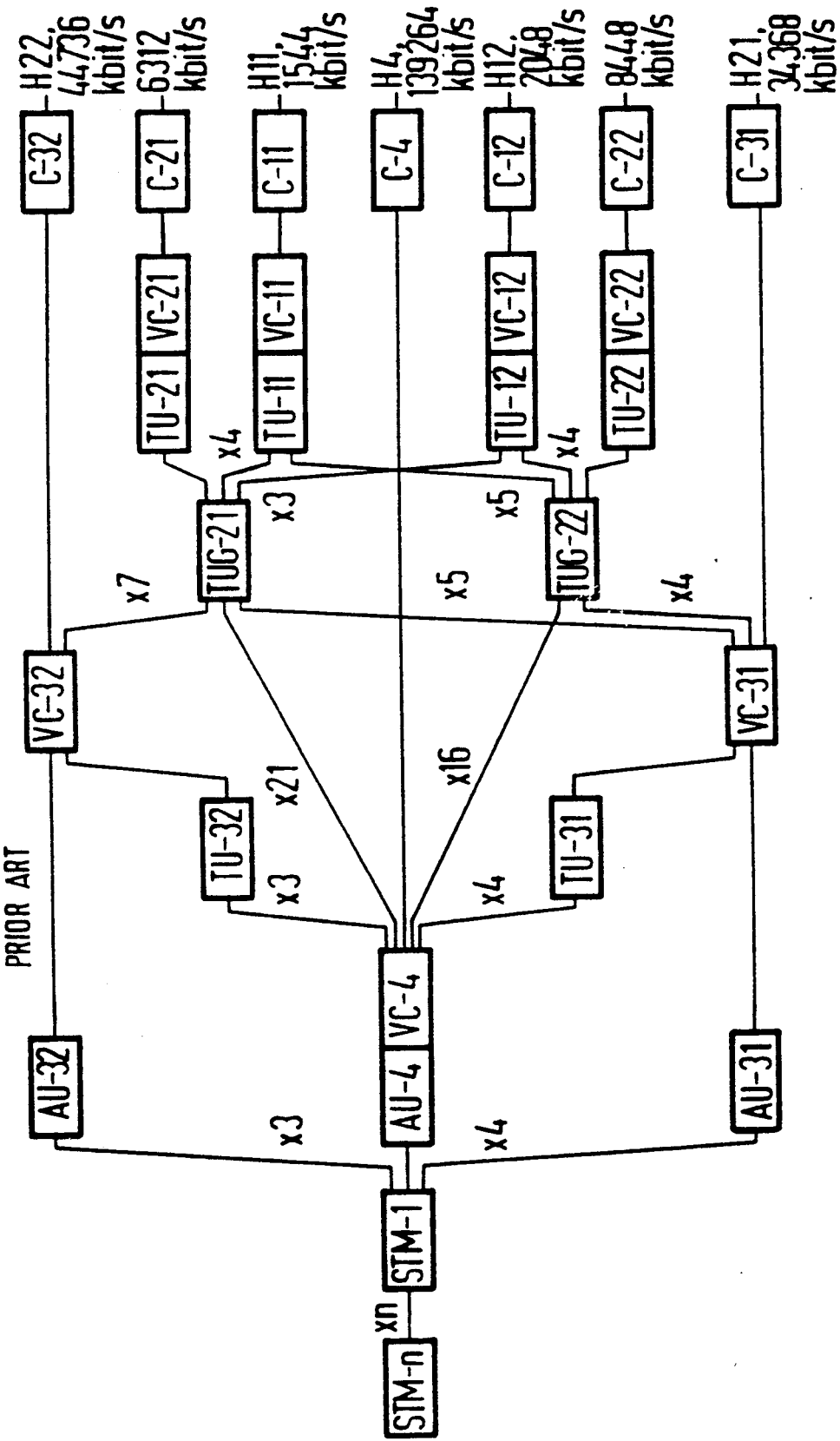
FIG. 1 shows a first multiplexing structure.

FIG. 1 shows the multiplexing structure of CCITT Recommendation G.709, FIG. 1.1/G.709. The references; AU denotes administration unit, C denotes container, H denotes digital signal, STM denotes synchronous transport module, TU denotes tributary unit, TUG denotes tributary unit group and VC denotes virtual container.

The digital signals to be transmitted are inserted into containers C-n at the input node to the synchronous network with positive filling. Every container is augmented to form a virtual container VC-n by attaching a path overhead POH, these virtual containers being periodically transmitted. The first byte of a virtual container is indicated by a pointer PTR whose chronological position in the transmission frame is fixed. The virtual container of a higher hierarchy level usually serves as such. A virtual container VC-n together with the pointer allocated to it forms a tributary unit TU-n. A plurality of these having the same structure can in turn be combined to form a tributary unit group TUG-n. The aforementioned CCITT Recommendations cite tributary unit groups TUG-21 for the North American 1.5 Mbit/s hierarchy and TUG-22 for the 2-Mbit/s hierarchy that, for example, is standard in Europe.

FIG. 1 shows the various ways via which a multiplexing or demultiplexing is possible. Thus, for example, sixty-four H12 signals can be inserted into the virtual container VC-4 either directly via the tributary unit group TUG-22 or via the route via the virtual container VC-31 and the formation of the tributary unit TU-31.

Figure 2:
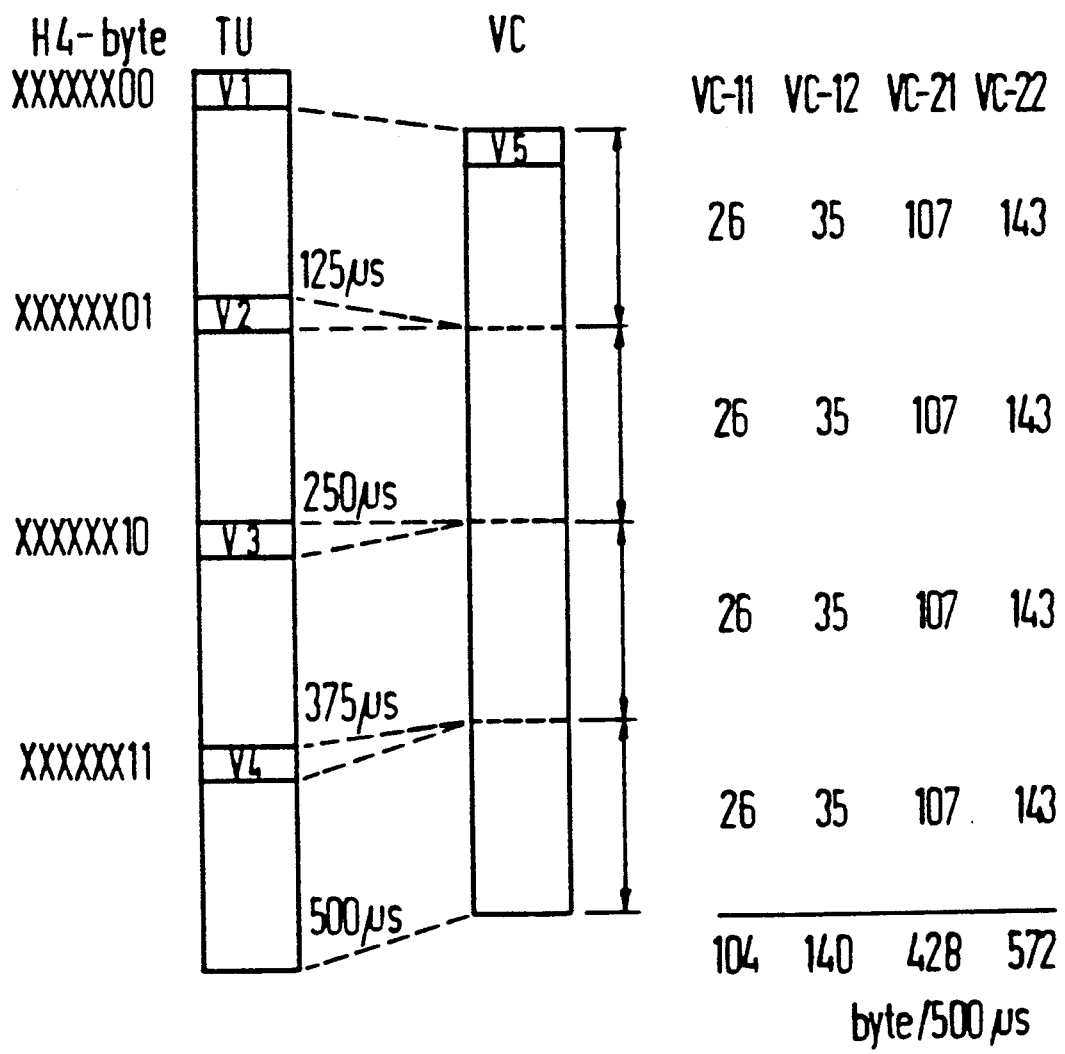
FIG. 2 shows a sub-system unit super-frame.
Figure 3:
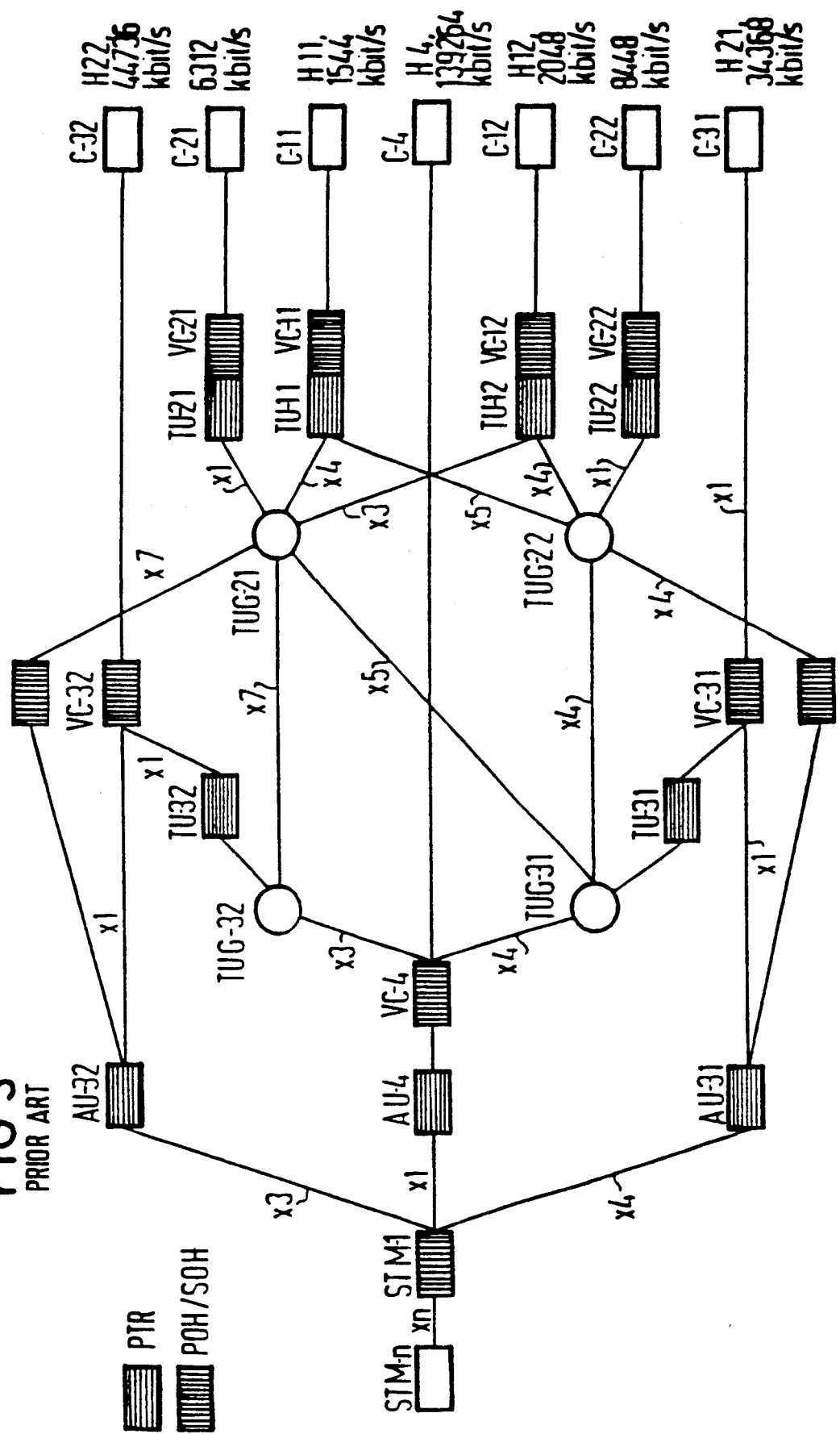
FIG. 3 shows a second multiplexing structure.

As FIG. 2 or the CCITT Recommendation G.709, FIG. 3.13/G.709 show, the tributary units TU-12 or, respectively, TU-22 are subdivided in super-frames of 500 $\mu$s each. Such a super-frame contains four frames having a period duration of 125 $\mu$s. The first byte V1, V2, V3 and V4 of each and every frame is defined in the CCITT Recommendation G.709. The bytes V1 are always situated in the first line of a super-frame. The path overhead POH of the virtual container VC-31 or, respectively, of the virtual container VC-4 defines the super-frame with a byte H4. The first line is identified by a byte J1. Thus, given the direct insertion of the tributary unit group TUG-22 into the virtual container VC-4, the path overhead POH of the virtual container VC-4 determines the position of the bytes Vn, whereas, given an insertion via the virtual container VC-31, the path overhead VC-31 POH of the virtual container VC-31 defines the arrangement of the bytes Vn.

Both methods have their advantages and disadvantages. The same multiplexing equipment, however, are required at both ends of a connection when a converter is not inserted into the connection that, for example, shapes the sixteen tributary unit groups TUG-22 of the one path into four tributary units TU-31 of the other path. This is also valid for the transmission of a maximum of sixteen 8448 kbit/s signals or for a mixing of 8448 kbit/s signals and 2048-kbit/s signals (H12 signals). The analogous case is true for the formatting of the virtual container VC-4 via twenty one tributary unit groups TUG-21 or three tributary units TU-31 for the 1.5 Mbit/hierarchy in the upper part of FIG. 1.

34,368-kbit/s signals (H21 signals) can be inserted only by way of the virtual container VC-31 and the tributary unit TU-31. A mixing of n×4 tributary unit groups TUG-22 with 4−n tributary units TU-31 with n=1, 2, 3 or 4 is not provided according to CCITT Recommendation G.709.

The arrangement of FIG. 3 of ETSI differs from that of FIG. 1 by the omission of the path from the tributary unit group TUG-22 via the virtual container VC-31 and the tributary unit TU-31 to the virtual container VC-4. On the other hand, it is possible to construct virtual containers VC-4 with a mixture of n×4 tributary unit groups TUG-22 and 4−n tributary units TU-31. Four tributary unit groups TUG-22 form one tributary unit group TUG-31. By contrast to a tributary unit TU-31, this does not have its own pointer and also does not have a common path overhead. However, the pointers of the tributary units TU-12 or TU-22 belonging to a tributary unit group TUG-31 are regularly arranged. Their position is defined by the path overhead VC-4 POH of the virtual container VC-4. In such a mixture, the first four columns of a container C-4 contain the TU-31 pointers or a fixed pattern (filling).

Figure 4:
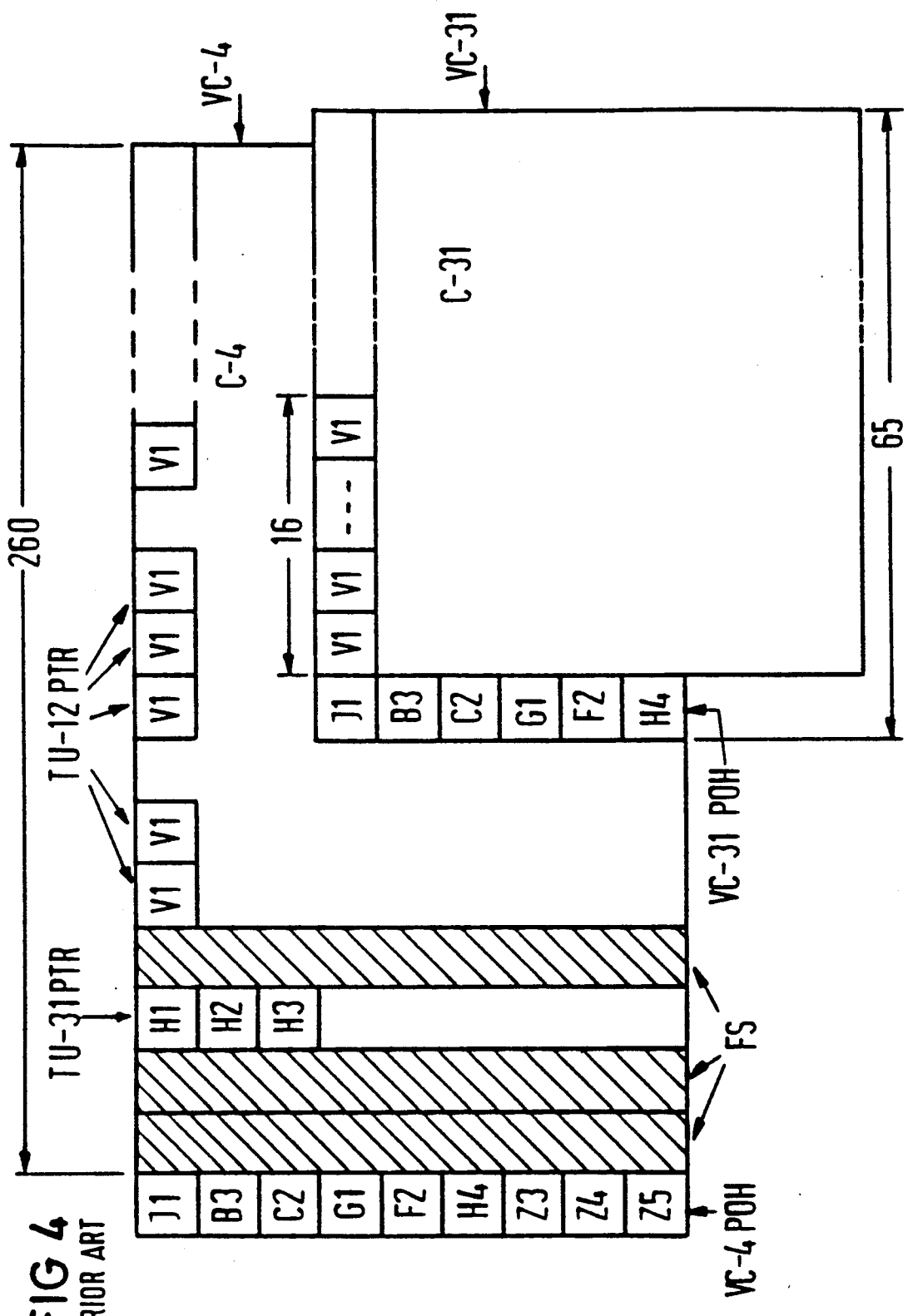
FIG. 4 shows a virtual container VC-4 with one sub-system unit TU-31 and three sub-system unit groups TUG-31.

FIG. 4 shows an example wherein two tributary unit groups TUG-31, one tributary unit TU-31 and a third tributary unit group TUG-31 are inserted in alternation in a virtual container VC-4 by columns. On the basis of an evaluation of the first four columns with fixed fill bytes FS and a pointer TU-31 PTR, information is obtained as to whether a tributary unit group TUG-31 or a tributary unit TU-31 is involved. The virtual container VC-31 that is shown at the bottom right is inserted by rows in alternation into the third of four columns after the path overhead VC-4 POH, whereby the position of the byte J1 is described by the pointer TU-31 PTR. The tributary unit groups TUG-31 begin in the first, second and fourth columns with a respective byte V1, there being forty eight of these in this example.

In digital cross-connectors, as in drop insert multiplexers, all signals that are to be combined to form a new output signal must be synchronized to the clock and to the frame of the output signal. All output signals STM-1 of a network node have the same clock and the same frame in the synchronous digital multiplex hierarchy. All signals that are passed through closed, are divided into tributary units and are again combined after a switching matrix network must therefore be synchronized to one another before their combination.

FIG. 5a shows a demultiplexer that precedes the switching matrix network at the input side. The arrangement contains an AU-4 PTR out-coupling means and evaluator 2, a VC-4 POH out-coupling means and evaluator 4, a container demultiplexer with synchronization means 6, a parallel brancher 7, a first path having a TU-3x PTR-out-coupling means and evaluator 8, with a TU-3x PTR switching matrix network clock matching pointer in-coupling means 10, and with a switching matrix network auxiliary information insertion means 12, contains a second path having a fixed fill byte out-coupling means 14, having a multiple TU-1y PTR out-coupling means and evaluator 16, having a multiple TU-1y switching matrix network clock matching pointer in-coupling and synchronizing means 18, and having a switching matrix network auxiliary information insertion means 20, as well as, a signal switch-over means 22. The units 7-22 are present four times for the 2-Mbit/s hierarchy and are present three times for the 1.5-Mbit/s hierarchy, being indicated for the former instance by the four outputs of the container demultiplexer with the synchronizing means 6. What is valid for the European hierarchy is x=1 and y=2; what is valid for the U.S. hierarchy is x=2 and y=1. The buffer memories required for every clock matching are not shown here and in the following figures for the sake of clarity.

The AU-4 administration unit of a synchronous transport module STM-1 is supplied to the input 1. The AU-4 PTR pointer is output and interpreted via an output 3 from the AU-4 PTR out-coupling means and evaluator 2. The remaining VC-4 virtual container proceeds to the VC-4 POH out-coupling means and evaluator 4 that evaluates the VC-4 POH path overhead and outputs it at its output 5. The information about the container start and the super-frame status are communicated to the following circuits 6, 18, 14, 16, 18 and 20. The C-4 container proceeds to the container demultiplexer with synchronizing means 6. Therein, it is divided into four TU-3x tributary units for the 2-Mbit/s hierarchy and into three TU-3x tributary units, four TUG-3x tributary unit groups or a mixture of the two for the 1.5-Mbit/s hierarchy. Either a respective TU-3x tributary unit or a TUG-3x tributary unit group are supplied to the four parallel branchers 7.

A check to see whether a TU-3x PTR pointer or whether fixed fill bytes FS are present is carried out in the TU-3x PTR out-coupling means and evaluator 8 in the first path and in the fixed fill byte out-coupling means 14 in the second path. When a TU-3x PTR pointer is present, this is evaluated and output via an output 9. The information about the container start and the super-frame status are communicated to the following circuits 10 and 12. When fixed fill bytes FS are present, these are output via an output 15.

A VC-3x virtual container with its source clock may be available at the output of the TU-3x PTR out-coupling means and evaluator 8. In the TU-3x switching matrix network clock matching pointer in-coupling means 10, this VC-3x virtual container is synchronized to the local switching matrix network clock derived from the network node clock upon insertion of a TU-3x PTR (KF) pointer for clock matching and, in the switching matrix network auxiliary information insertion means 12, is inserted into a switching matrix network super-frame together with the switching matrix network auxiliary information KFOH at the input 13. When the output 23 is connected via the signal switch-over means 22 to the output of the switching matrix network auxiliary information insertion means 12, a D39 digital signal is available at the output for x=1 and a D52 digital signal is available at the output for x=2. This can be supplied either to a demultiplexer (not shown) for resolution of the VC-3x virtual container or to a multiplexer according to FIG. 5b for constructing a new AU-4 administration unit.

If, however, fixed fill bytes were to be recognized in the fixed fill byte out-coupling means 14, a TUG-3x tributary unit group would appear at its main output, and this would be composed either of sixteen TU-12 tributary units or of twenty eight TU-11 tributary units (m TU-1y tributary units). In the multiple TU-1y PTR out-coupling means and evaluator 16, m TU-1y PTR pointers would be evaluated and eliminated via an output 17. The m VC-1y virtual containers would proceed from the multiple TU-1y PTR out-coupling means and evaluator 16 to the multiple TU-1y switching matrix network clock matching pointer in-coupling and synchronizing means 18. Upon insertion of m TU-1y PTR (KF) pointers, it would be synchronized there to the local switching matrix network clock and, via an input 21, would be embedded into the switching matrix network super-frame in the switching matrix network auxiliary information insertion means 20 upon supply of the switching matrix network auxiliary information KFOH. If the signal switch-over means 22 were now to connect the output 23 to the main output of the switching matrix network auxiliary information insertion means 20, either a D39 digital signal or a D52 digital signal would likewise proceed to the output 23.

The switching matrix network overhead insertion means 20 expediently also contains a "router" function (time switching matrix network) with which the chronological sequence of the m VC-1y virtual containers can be varied.

The D39 or D52 digital signal now available at the output 23 can be supplied via a time slot-controlled switching matrix network either to a demultiplexer (not shown) for resolution of the individual VC-1y virtual containers into plesiochronic signals H1y via C-1y containers or can be supplied to a multiplexer conforming to FIG. 5a for constructing new AU-4 administration units.

FIG. 5b shows a multiplexer for the transmission side of the switching matrix network. The arrangement contains a parallel brancher 25, a first path having a switching matrix network overhead out-coupling means 26, having a TU-3x switching matrix network clock matching pointer out-coupling means and evaluator 28 and having a TU-3x PTR in-coupling means 30. The arrangement further contains a signal switchover means 32, a container multiplexer 33, a VC-4 POH in-coupling means 34, an AU-4 PTR in-coupling means 36. The arrangement also contains a second path having a switching matrix network overhead out-coupling means 39, having a multiple TU-1y switching matrix network clock matching pointer out-coupling means and evaluator 41, having a multiple TU-1y PTR in-coupling means 43 and having a fixed fill byte in-coupling means 45.

The multiplexing method is executed in the inverse sequence of the demultiplexer according to FIG. 5a. First, the switching matrix network overhead KFOH is out coupled, evaluated and output via the output 27 in the switching matrix network overhead out-coupling means 26. The TU-3x PTR (KF) pointer is evaluated and output via the output 29 in the TU-3x switching matrix network clock matching pointer out-coupling means and evaluator 28. A TU-3x PTR pointer is attached to the remaining VC-3x virtual container in the TU-3x PTR in-coupling means 30. However, no clock matching by filling is thereby required since all D39 or, respectively, D52 digital signals have already been synchronized to the network node clock before the switching matrix network.

In the case of the D39 or D52 digital signal, the switching matrix network overhead information KFOH is evaluated in the switching matrix network overhead out-coupling means 39 and is output via the output 40. The remaining m TU-1y tributary units proceed to the multiple TU-1y switching matrix network clock matching pointer out-coupling means and evaluator 41 where the m TU-1y PTR (KF) pointers are evaluated and output via the output 42. Here, too, no clock matching by filling is required since all D39 or, respectively, D52 digital signals were already synchronized to the network node clock before the switching matrix network. The m TU-1y PTR pointers are supplied to the remaining m VC-1y virtual containers in the multiple TU-1y PTR in-coupling means 43 via an input 44. Fixed filled bytes FS are attached into the output TUG-3x tributary unit group in the fixed fill byte in-coupling means 45.

The position of the signal switch-over means 32 is based on the signal content of the D39 or, respectively, D52 signal or is defined by a network management. Occurring in the container multiplexer 33 is a byte-by-byte nesting of four TU-3x tributary units for the 2-Mbit/s hierarchy and of three TU-3x tributary units and/or TUG-3x tributary unit groups for the 1.5-Mbit/s hierarchy. A VC-4 POH path overhead is attached to the C-4 container in the VC-4 POH in-coupling means 34 via an input 35. An AU-4 PTR pointer is attached to the VC-4 virtual container formed in this way in the AU-4 PTR in-coupling means 36, so that an AU-4 administration unit of a synchronous transport module STM-1 can be output at the output 38.

The demultiplexer shown in FIG. 5a and the multiplexer shown in FIG. 5b is suitable for "drop and insert" functions, for "routing" functions and cross-connects for signals at the nodes of TUG-3x tributary unit groups of the ETSI proposal according to FIG. 3.

With the additional functions shown in FIGS. 6a and 6b, TUG-2y tributary unit groups of FIG. 1 can also be conducted into the VC-4 virtual container via VC-3x virtual containers and TU-3x tributary units and can be handled in a corresponding way.

By contrast the to the demultiplexer of FIG. 5a, the demultiplexer of FIG. 6a additionally contains a third path having a parallel branching 47, having a VC-3x POH out-coupling means 48 and having a signal switchover means 50. By contrast to the multiplexer of FIG. 5b, the multiplexer of FIG. 6b additionally contains a third path having a switch-over means 51, having a VC-3x POH in-coupling means 52 and having a parallel branching 54. When a VC-3x virtual container is to be through-connected in closed form, then the path leads via the units 47, 10, 12 and 22 or, respectively, 25, 26, 28 and 51. When, however, a VC-3x virtual container is to be divided into its TU-1y tributary units, then the paths via the units 47, 48, 50, 16, 18, 20 and 22 or, respectively, 25, 39, 41, 43, 54, 52 and 51 are activated. The VC-3x POH path overhead is taken from a VC-3x virtual container and evaluated in the VC-3x POH out-coupling means 48 via an output 49. This indicates the start byte and super-frame affiliation for the C-3x container. The content of the C-3x container has the same structure as a TUG-3x tributary unit group and can therefore be handled farther via the units 16, 18 and 20 as in FIG. 5a.

Correspondingly, a VC-3x POH path overhead is attached to the VC-3x POH in-coupling means 52 in FIG. 6b via an input 53.

The functions in the respectively first and second paths shown in FIGS. 5a, 5b, 6a and 6b largely coincide. In FIGS. 5a and 5b, thus, the pointer column of an incoming TU-3x tributary unit is investigated and gated out in the units 8 and 14. The units 10 and 18 serve the purpose of inserting the TU-3x PTR (KF) pointer synchronized to the switching matrix network clock and super-frame and the units 12 and 20 serve the purpose of inserting the switching matrix network overhead KFOH. The analogous case applies to the multiplexer side in FIGS. 5b and 6b.

Figure 7:
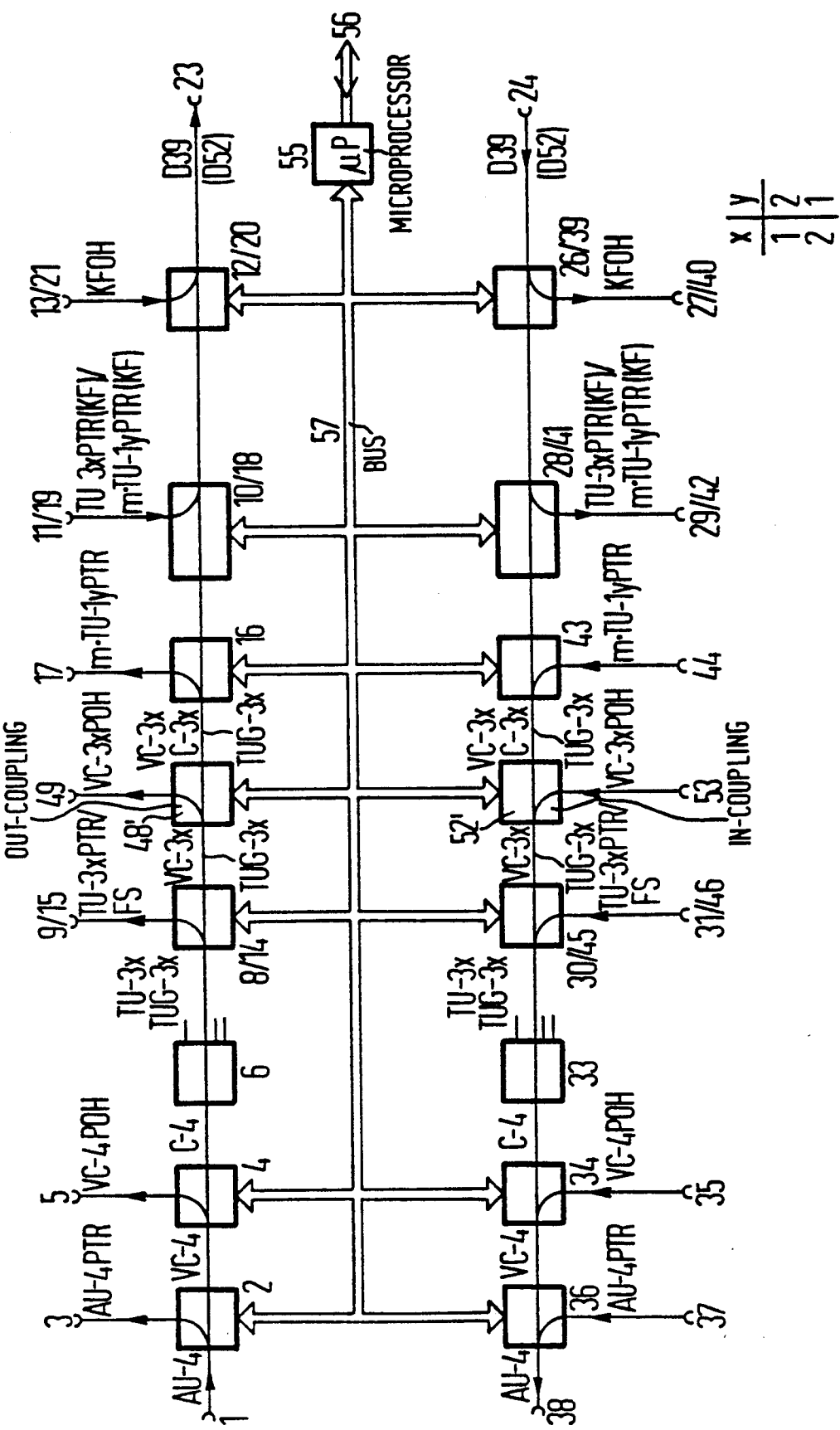
FIG. 7 shows a second demultiplexer and multiplexer controlled in common.

FIG. 7 shows an arrangement in which these parallel functions are respectively executed by a single function unit. These are given reference characters wherein the two, original reference characters are joined by a slash. The VC-3x POH out-coupling means 48' and the VC-3x POH in-coupling means 52' must also assume through-connection functions for the respectively first and second path.

An AU-4 administration unit incoming at the input 1 is edited in the equipment 2, 4 and 6, is synchronized to the network node clock and divided into its TU-3x tributary units or TUG-3x tributary unit groups. A determination is made in the unit 8/14 to see whether the first point column contains a TU-3x PTR pointer or fixed fill bytes FS. In the former instance, only the first three bytes of the column are evaluated and taken from the signal. In the second instance, by contrast, the entire column having nine bytes is taken. If the TU-3x tributary unit or the TUG-3x tributary unit group is to be divided farther, for example into their m TU-1y tributary units, then the VC-3x POH path overhead is first resolved in the unit 48' for a TU-3x tributary unit. This step is eliminated given a TUG-3x tributary unit group. Subsequently, the m TU-1y PTR pointers must be evaluated in the unit 16 with the assistance of the byte H4 from the VC-4 POH path overhead or from the VC-3x POH path overhead. The synchronization to the switching matrix network clock and super-frame and an insertion of the TU-3x PTR (KF) pointer or TU-1y PTR (KF) pointer of the switching matrix network ensues in the unit 10/18. The D39 or, respectively, D52 signal is formed by attaching the switching matrix network overhead KFOH in the unit 12/20.

The formatting of the multiplex signal in the opposite direction ensues correspondingly between the input 24 and the output 38. All function units are controlled via a bus system 57 by a microprocessor 55 that is connected to a network management system via a terminal 56.

The connection of a switching matrix network (cross-connect equipment 62) to the demultiplexers 61, 61' depicted in FIGS. 5a and 6a and to the multiplexers 63, 63' depicted in FIGS. 5b and 6b is shown in FIG. 8. An STM-1 signal is supplied via an input 58 to an out-coupling means (evaluator 59) which outputs the Section Overhead SOH via terminal 60. This leaves an Administration Unit AU-4 with an AU-4 pointer which is supplied to input 1 of the demultiplexer 61 (according to either FIG. 5a or 6a).

An Administrative Unit AU-4 with an AU-4 pointer is provided to an in-coupling means 64 by the multiplexer 63 (according to either FIG. 5b or 6b). A Section Overhead SOH is supplied via terminal 65 to the in-coupling means 64 so that an STM-1 signal is available at the output 66 of the in-coupling means 64. As depicted in FIG. 8 a plurality of the above-described circuits are connected to the cross-connect equipment 62, one example being shown by use of the same reference numerals with an apostrophe. Every outgoing STM-1 signal can contain virtual containers VC from different received STM-1 signals, for example, see FIG. 3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A cross-connect method for STM-1 signals of a synchronous digital multiplex hierarchy upon multiple employment of demultiplexing methods wherein each STM-1 signal is first divided into three (AU-32, TU-32, TUG-32) or, respectively, four (AU-31, TU-31, TUG-31) upper units and subsequently respectively divided into sub-units (TUG-21, TU-11, TU-12, TUG-22, TU-12, TU-22) including individual outputs (VC-32, VC-31) to provide at least one of 1544, 6312, 44,736, 2048, 8448, and 34,368 kbit/s signals, optionally via different paths, upon multiple employment of multiplexing methods that reverse these demultiplexing methods, and upon operation of a switching matrix network, comprising the steps of:
   demultiplexing STM-1 signals into virtual container groups of substantially the same length;
   respectively attaching an individual switching matrix network clock matching pointer, as well as, an individual switching matrix network overhead to these virtual container groups for the formation of uniform switching matrix network input signals upon waiver of auxiliary signals that are no longer required;
   controlled by at least one of instructions carried in the switching matrix network input signals and a network management, supplying switching matrix network input signals deriving respectively from an upper unit to the switching matrix network;
   rearranging the virtual containers of the switching matrix network input signals before acceptance into the switching matrix network output signals;
   taking and out-coupling the switching matrix network overheads from the switching matrix network output signals;
   multiplexing the switching matrix network output signals to form STM-1 output signals; and
   controlled by the at least one of instructions carried in the switching matrix network output signals and the network management, respectively selecting one path in the multiplexing.

2. The method according to claim 1, wherein a switching matrix network frame alignment signal, switching matrix network route addresses, and switching matrix network quality monitoring information are provided as switching matrix network overhead.

3. The method according to claim 1, wherein a switching matrix network overhead is attached only to the switching matrix network input signals supplied to the switching matrix network.

4. The method according to claim 1, wherein the virtual container groups are at least one of 16×VC-12, 4×VC-22, 1×VC-31, 20×VC-11 and 5×VC-21 virtual container groups;
   wherein the switching matrix network clock matching pointers are at least one of TU-12 PTR (KF), TU-22 PTR (KF), TU-31 PTR (KF), TU-11 PTR (KF) and TU-21 PTR (KF) switching matrix network clock matching pointers; and
   wherein the switching matrix network input signals and output signals (D39) have a bit rate of 38,912 kbit/s.

5. The method according to claim 1, wherein the virtual container groups are at least one of 28×VC-11, 7×VC-21, 1×VC-32 and 21×VC-12 virtual container groups;

wherein the switching matrix network clock matching pointers are at least one of TU-11 PTR (KF), TU-21 PTR (KF), TU-32 PTR (KF) and TU-12 PTR (KF) switching matrix network clock matching pointers; and wherein the switching matrix network input signals and output signals (D52) have a bit rate of 51,968 kbit/s.

6. The method according to claim 1, wherein for the input side of the switching matrix network, a VC-4 virtual container is taken from a STM-1 signal from its AU-4 administration unit upon out-coupling and evaluation of an AU-4 PTR administration unit pointer, a C-4 container is taken from the VC-4 virtual container upon out-coupling and evaluation of its VC-4 POH path overhead, and the C-4 container is divided into four alternative pairs each alternative pair respectively composed of one TU-3x tributary unit and one TUG-3x tributary unit group, the method further comprising the steps of:

supplying each alternative pair to two paths connected at the input side and alternately through-connectable to the switching matrix network at the output side;

in the first path, taking a VC-3x virtual container from a TU-3x tributary unit upon out-coupling and evaluation of the TUG-3x PTR tributary unit pointer and attaching a TU-3x PTR (KF) switching matrix network clock matching pointer and a switching matrix network overhead (KFOH) to the VC-3x virtual container; and in the second path, taking a fixed filling (FS) and a plurality m of TUG-1y PTR tributary unit pointers from the TUG-3x tributary unit group upon evaluation and attaching a plurality m of TU-1y PTR (KF) switching matrix network clock matching pointers and a switching matrix network overhead (KFOH) to the remaining plurality m of VC-1y virtual container for the formation of a switching matrix network input signal (D39, D52) where $x=1$ and $y=2$, or where $x=2$ and $y=1$; where $m=28$ for $y=1$, or where $m=16$ for $y=2$.

7. The method according to claim 6, wherein the VC-3x virtual container is supplied to a third path that branches off from the first path;

a C-3x container is taken from the VC-3x virtual container on the third path upon out-coupling of its VC-3x POH path overhead; and instead of the TUG-3x tributary unit group without fixed FS filling, this C-3x container is supplied to the remaining part of the second path upon disconnection of the corresponding, first part of the second path.

8. The method according to claim 1, wherein for respectively four switching matrix network output signals, a respective VC-4 POH path overhead is attached to C-4 containers for the formation of a VC-4 virtual container, and a respective AU-4 PTR pointer is attached to the VC-4 virtual containers for the formation of AU-4 administration units of STM-1 signals, the method further comprising the steps of:

forming groups of four switching matrix network output signals;

supplying each switching matrix network output signal (D29, D52) to two paths that are connected at the input side and are alternately through-connectable at the output side;

taking the switching matrix network overhead (KFOH) and the TU-3x PTR (KF) switching matrix network clock matching pointer in the first path for acquiring a TU-3x tributary unit and attaching a TU-3x PTR pointer;

taking the switching matrix network overhead (KFOH) and a plurality m of TU-1y PTR (KF) switching matrix network clock matching pointers in the second path for acquiring a TUG-3x tributary unit group and attaching a plurality m of TU-1y PTR pointers and a fixed filling (FS); and inserting either the TU-3x tributary unit or the TUG-3x tributary unit group of each of the four alternative pairs into a C-4 container where $x=1$ and $y=2$, or where $x=2$ and $y=1$; where $m=28$ for $y=1$, or where $m=16$ for $y=2$.

9. The method according to claim 8, wherein the TUG-3x tributary unit group without fixed filing (FS) is supplied to a third path branching off from the second path after the in-coupling of a plurality m of TU-1y PTR pointers;

a VC-3x POH path overhead is attached to a C-3x container in the third path for the formation of a VC-3x virtual container; and this VC-3x virtual container is supplied into the remaining part of the first path for the acceptance of the TU-3x PTR pointer upon disconnection of the corresponding, first part of the first path.

10. The method according to claim 6, wherein the attaching of the TU-3x PTR (KF) switching matrix clock matching pointer to the VC-3x virtual container and the attaching of a plurality m of TU-1y PTR (KF) switching matrix network clock matching pointers to the remaining plurality m of VC-1y virtual containers is performed in an element common to both the first and second paths, and wherein the attaching of the switching matrix network overhead (KFOH) to the VC-3x virtual container and the attaching of the switching matrix network overhead (KFOH) to the remaining plurality m of VC-1y virtual container is performed in another element common to both the first and second paths.

11. The method according to claim 6, wherein the method further comprises the step of switching to one of the first and second paths thereby connecting the one of the first and second paths between the input side and the output side, the switching to the one of the first and second paths being based on at least one of the signal content of the switching matrix network input signal and the network management.

12. The method according to claim 1, wherein the method steps are controlled by a microprocessor.

13. The method according to claim 1, wherein the steps of the method are carried out in an integrated circuit.

14. The method according to claim 10, wherein the attaching of the TU-3x PTR (KF) switching matrix clock matching pointer to the VC-3x virtual container and the attaching of a plurality m of TU-1y PTR (KF) switching matrix network clock matching pointers to the remaining plurality m of VC-1y virtual containers is performed in an element common to both the first and second paths, and wherein the attaching of the switching matrix network overhead (KFOH) to the VC-3x virtual container and the attaching of the switching matrix network overhead (KFOH) to the remaining plurality m of VC-1y virtual container is performed in another element common to both the first and second paths.

15. The method according to claim 8, wherein the method further comprises the step of switching to one of the first and second paths thereby connecting the one of the first and second paths between the input side and the output side, the switching to the one of the first and second paths being based on at least one of the signal content of the switching matrix network input signal and the network management.

16. A cross-connect method for STM-1 signals of a synchronous digital multiplex hierarchy upon multiple employment of demultiplexing methods wherein each STM-1 signal is first divided into three (AU-32, TU-32, TUG-32) or, respectively, four (AU-31, TU-31, TUG-31) upper units and subsequently respectively divided into sub-units (TUG-21, TU-11, TU-12, TUG-22, TU-12, TU-22) including individual outputs (VC-32, VC-31) to provide at least one of 1544, 6312, 44,736, 2048, 8448, and 34,368 kbit/s signals, optionally via different paths, upon multiple employment of multiplexing methods that reverse these demultiplexing methods, and upon operation of a switching matrix network, comprising the steps of:
   demultiplexing STM-1 signals into virtual container groups of substantially the same length;
   respectively attaching an individual switching matrix network clock matching pointer, as well as, an individual switching matrix network overhead to these virtual container groups for the formation of uniform switching matrix network input signals upon waiver of auxiliary signals that are no longer required;
   controlled by at least one of instructions carried in the switching matrix network input signals and a network management, supplying switching matrix network input signals deriving respectively from an upper unit to the switching matrix network;
   rearranging the virtual containers of the switching matrix network input signals before acceptance into the switching matrix network output signals;
   taking and out-coupling the switching matrix network overheads from the switching matrix network output signals;
   multiplexing the switching matrix network output signals to form STM-1 output signals; controlled by the at least one of instructions carried in the switching matrix network output signals and by the network management, respectively selecting one path in the multiplexing;
   for the input side of the switching matrix network, a VC-4 virtual container being taken from a STM-1 signal from its AU-4 administration unit upon out-coupling and evaluation of an AU-4 PTR administration unit pointer, a C-4 container being taken from the VC-4 virtual container upon out-coupling and evaluation of its VC-4 POH path overhead, and the C-4 container being divided into four alternative pairs each alternative pair respectively composed of one TU-3x tributary unit and one TUG-3x tributary unit group, supplying each alternative pair to two paths connected at the input side and alternately through-connectable to the switching matrix network at the output side, in the first path, taking a VC-3x virtual container from the TU-3x tributary unit upon out-coupling and evaluation of a TUG-3x PTR tributary unit pointer and a TU-3x PTR (KF) switching matrix network clock matching pointer and attaching a switching matrix network overhead (KFOH) to the VC-3x virtual container, and in the second path, taking a fixed filling (FS) and a plurality m of TUG-1y PTR tributary unit pointers from the TUG-3x tributary unit group upon evaluation and attaching a plurality m of TU-1y PTR (KF) switching matrix network clock matching pointers and a switching matrix network overhead (KFOH) to the remaining plurality m of VC-1y virtual container for the formation of a switching matrix network input signal (D39, D52) where $x=1$ and $y=2$, or where $x=2$ and $y=1$; where $m=28$ for $y=1$, or where $m=16$ for $y=2$.

17. The method according to claim 16, wherein the VC-3x virtual container is supplied to a third path that branches off from the first path;
   a C-3x container is taken from the VC-3x virtual container on the third path upon out-coupling of its VC-3x POH path overhead; and
   instead of the TUG-3x tributary unit group without fixed FS filling, this C-3x container is supplied into the remaining part of the second path upon disconnection of the corresponding, first part of the second path.

18. A cross-connect method for STM-1 signals of a synchronous digital multiplex hierarchy upon multiple employment of demultiplexing methods wherein each STM-1 signal is first divided into three (AU-32, TU-32, TUG-32) or, respectively, four (AU-31, TU-31, TUG-31) upper units and subsequently respectively divided into sub-units (TUG-21, TU-11, TU-12, TUG-22, TU-12, TU-22) including individual outputs (VC-32, VC-31) to provide at least one of 1544, 6312, 44,736, 2048, 8448, and 34,368 kbit/s signals, optionally via different paths, upon multiple employment of multiplexing methods that reverse these demultiplexing methods, and upon operation of a switching matrix network, comprising the steps of:
   demultiplexing STM-1 signals into virtual container groups of substantially the same length;
   respectively attaching an individual switching matrix network clock matching pointer, as well as, an individual switching matrix network overhead to these virtual container groups for the formation of uniform switching matrix network input signals upon waiver of auxiliary signals that are no longer required;
   controlled by at least one of instructions carried in the switching matrix network input signals and a network management, supplying switching matrix network input signals deriving respectively from an upper unit to the switching matrix network;
   rearranging the virtual containers of the switching matrix network input signals before acceptance into the switching matrix network output signals;
   taking and out-coupling the switching matrix network overheads from the switching matrix network output signals;
   multiplexing the switching matrix network output signals to form STM-1 output signals;
   controlled by the at least one of instructions carried in the switching matrix network output signals and the network management, respectively selecting one path in the multiplexing;
   for respectively four switching matrix network output signals, a respective VC-4 POH path overhead being attached to C-4 containers for the formation of a VC-4 virtual container, and a respective AU-4

PTR pointer being attached to the VC-4 virtual containers for the formation of AU-4 administration units of STM-1 signals, forming groups of four switching matrix network output signals;

supplying each switching matrix network output signal (D39, D52) to two paths that are connected at the input side and are alternately through-connectable at the output side;

taking the switching matrix network overhead (KFOH) and a TU-3x PTR (KF) switching matrix network clock matching pointer in the first path for acquiring a TU-3x tributary unit and attaching a TU-3x PTR pointer;

taking the switching matrix network overhead (KFOH) and a plurality m of TU-1y PTR (KF) switching matrix network clock matching pointers in the second path for acquiring a TUG-3x tributary unit group and attaching a plurality m of TU-1y PTR pointers and a fixed filling (FS); and inserting either the TU-3x tributary unit of the TUG-3x tributary unit group of each of the four alternative pairs into a C-4 container where $x=1$ and $y=2$, or where $x=2$ and $y=1$; where $m=28$ for $y=1$, or where $m=16$ for $y=2$.

19. The method according to claim 18, wherein the TUG-3x tributary unit group without fixed filling (FS) is supplied to a third path branching off from the second path after the in-coupling of a plurality m of TU-1y PTR pointers;

a VC-3x POH path overhead is attached to a C-3x container in the third path for the formation of a VC-3x virtual container; and this VC-3x virtual container is supplied into the remaining part of the first path for the acceptance of the TU-3x PTR pointer upon disconnection of the corresponding, first part of the first path.

* * * * *